(12) United States Patent
Grover (10) Patent No.: US 11,824,987 B2
(45) Date of Patent: Nov. 21, 2023

(54) USING CAPSTONE BLOCKS IN A BLOCKCHAIN WITH A TRUSTED AUTHORITY

(71) Applicant: MICRO FOCUS LLC, Santa Clara, CA (US)

(72) Inventor: Douglas Max Grover, Provo, UT (US)

(73) Assignee: MICRO FOCUS LLC, Santa Clara, CA (US)

( * ) Notice: Subject to any disclaimer, the term of this patent is extended or adjusted under 35 U.S.C. 154(b) by 74 days.

(21) Appl. No.: 17/544,789

(22) Filed: Dec. 7, 2021

(65) Prior Publication Data

US 2023/0179416 A1  Jun. 8, 2023

(51) Int. Cl.
*H04L 29/06* (2006.01)
*H04L 9/32* (2006.01)
*H04L 9/06* (2006.01)

(52) U.S. Cl.
CPC ............ *H04L 9/321* (2013.01); *H04L 9/0637* (2013.01)

(58) Field of Classification Search
CPC .............................. H04L 9/321; H04L 9/0637
See application file for complete search history.

(56) References Cited

U.S. PATENT DOCUMENTS

| | | | | |
|---|---|---|---|---|
| 6,408,330 | B1* | 6/2002 | DeLaHuerga | G06F 21/35 709/217 |
| 10,476,696 | B2* | 11/2019 | Madhani | G06F 1/26 |
| 10,673,617 | B1* | 6/2020 | Antoniou | G06F 13/4282 |
| 10,735,183 | B1* | 8/2020 | Mehta | H04L 63/045 |
| 11,494,392 | B2* | 11/2022 | Lewis | G06F 21/64 |
| 11,620,403 | B2* | 4/2023 | Chen | G06F 16/9535 713/193 |
| 2005/0091338 | A1* | 4/2005 | de la Huerga | G07C 9/28 709/217 |
| 2020/0336295 | A1* | 10/2020 | Winarski | G11B 5/78 |
| 2020/0412524 | A1 | 12/2020 | Das et al. | |
| 2021/0097528 | A1 | 4/2021 | Wang | |
| 2021/0314155 | A1 | 10/2021 | Novotny | |

FOREIGN PATENT DOCUMENTS

CN  109978693 A  7/2019

* cited by examiner

*Primary Examiner* — Mahfuzur Rahman

(74) *Attorney, Agent, or Firm* — SHERIDAN ROSS P.C.

(57) ABSTRACT

An event is detected. The event is a designated event for capturing a snapshot of a blockchain where the blockchain is not replicated in a distributed ledger. For example, the event may be where a specific number of new blocks have been added to the blockchain. In response to detecting the event, a capstone block or a lock block is created. The capstone block or the lock block is added to the blockchain. A copy of the capstone block or the copy of the lock block sent to a trusted authority. The copy of the capstone block or the copy of the lock block is used to validate some or all the blockchain to detect if the blockchain has been changed. For example, validating the blockchain may be to detect if the blockchain has been tampered with or has become corrupted.

20 Claims, 9 Drawing Sheets

USING CAPSTONE BLOCKS IN A BLOCKCHAIN WITH A TRUSTED AUTHORITY

FIELD

The disclosure relates generally to blockchain and particularly to using blockchains with trusted authorities.

BACKGROUND

One of the advantages of blockchain technology is that it provides immutability by replicating the blockchain in a distributed ledger. However, using a distributed ledger not only makes the development more complicated, but it also makes the implementation more complicated and expensive by requiring additional hardware and increased power consumption costs. This is especially true as the size of the blockchain increases and/or the number of nodes in the distributed ledger increases.

SUMMARY

These and other needs are addressed by the various embodiments and configurations of the present disclosure. The present disclosure can provide a number of advantages depending on the configuration. These and other advantages will be apparent from the disclosure contained herein.

An event is detected. The event is a designated event for capturing a snapshot of a blockchain where the blockchain is not replicated in a distributed ledger. For example, the event may be where a specific number of new blocks have been added to the blockchain. In response to detecting the event, a capstone block or a lock block is created. The capstone block or the lock block is added to the blockchain. A copy of the capstone block or the copy of the lock block sent to a trusted authority. The copy of the capstone block or the copy of the lock block is used to validate some or all the blockchain to detect if the blockchain has been changed. For example, validating the blockchain may be to detect if the blockchain has been tampered with or has become corrupted.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all the equivalents thereof, Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
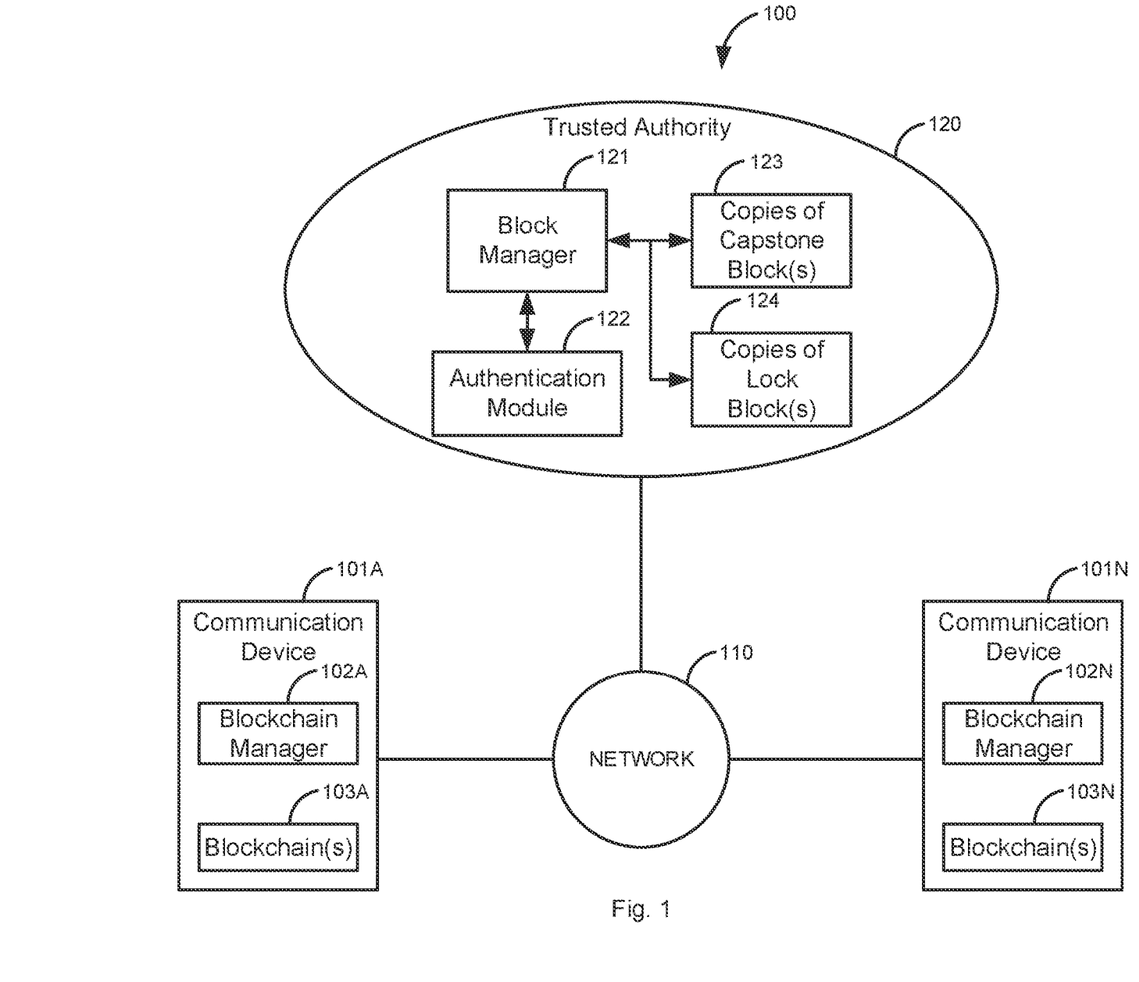
FIG. 1 is a block diagram of a first illustrative system for using capstone blocks in a blockchain with a trusted authority.

FIG. 1 is a block diagram of a first illustrative system 100 for using capstone blocks in a blockchain 103 with a trusted authority 120. The first illustrative system 100 comprises communication devices 101A-101N, a network 110, and the trusted authority 120.

The communication device 101 can be or may include any device that can communicate on the network 110, such as a Personal Computer (PC), a telephone, a video system, a cellular telephone, a Personal Digital Assistant (PDA), a tablet device, a notebook device, a smart phone, a server, a gateway, a database server, a web server, a blockchain server, and/or the like. As shown in FIG. 1, any number of communication devices 101A-101N may be connected to the network 110, including only a single communication device 101.

The communication devices 101A-101N further comprise blockchain managers 102A-102N and blockchains 103A-103N. The blockchain managers 102A-102N can be or may include any hardware coupled with software that can manage the blockchains 103A-103N. The blockchain managers 102A-102N may manage several blockchains 103A-103N. For example, the blockchain manager 102A may manage the blockchain 103A along with one or more additional blockchains 103 on the communication device 101A.

The blockchain(s) 103A-103N may be any known or new configuration of blockchains. Typically, the blockchains 103A-103N are standalone blockchains 103 that are not part of a distributed ledger. Traditional blockchains 103 require a distributed blockchain ledger that has multiple copies of the blockchain 103 on different communication devices 101 to provide immutability. However, in the implementations described herein, a distributed ledger is not required to provide immutability. Not needing the distributed ledger not only reduces the complexity of the first illustrative system 100, but dramatically reduces the power consumption and hardware costs that come with using a distributed blockchain ledger. In addition, validation time and access time to the information in the blockchain are dramatically reduced because a distributed blockchain ledger is not used. In other words, the embodiments described herein are more efficient and cost effective.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications. The network 110 may be a public network, a private network, and/or a combination of a public/private network.

The trusted authority 120 can be or may include any trusted authority 120, such as, a trusted third-party system, an authentication server, a certificate authority, a blockchain verification service, a cloud service, and/or the like. The trusted authority 120 is a service that is used to validate one or more existing blockchains 103. The trusted authority 120 may work at a corporate/entity level where multiple corporations/entities are individual tenants of the trusted authority 120. For example, the communication device 101A may be owned by tenant A and communication device 101N may be owned by tenant B. The trusted authority 120 provides separate validation services for each of the individual tenants and their respective blockchain(s) 103. In one embodiment, the trusted authority 120 may only manage a single tenant (i.e., the communication devices 101A-101N are owned by the same tenant). In one embodiment the trusted authority 120/communication devices 101A-101N may all be owned by the same entity.

The trusted authority 120 further comprises a block manager 121, an authentication module 122, copies of capstone block(s) 123, and copies of lock block(s). The block manager 121 manages the copies of the capstone block(s) 123/copies of the lock block(s) 124. The block manager 121 may manage the copies of the capstone block(s) 123/copies of the lock block(s) 124 on an individual tenant basis.

The authentication module 122 provides authentication services for the communication devices 101A-101N (e.g., for the tenants). For example, the authentication module 122 may require a digital certificate, a user credential (e.g., a username/password, biometric, etc.) to validate that the communication devices 101A-101N are not malicious parties. The authentication module 122 may use any existing authentication techniques.

The copies of capstone block(s) 123 are copies of capstone block(s) 123 that are stored in the blockchains 103A-103N. A capstone block is added to the blockchains 103A-103N based on a designed event for capturing a snapshot of the blockchains 103A-103N. For example, the designed event may be an administered event, a periodic event (e.g., for every 100 blocks added to a the blockchain 103, every week, etc.), an event based on a specific action (e.g., check-in of all components for testing of a software application), an event on a specific date, and/or the like. Once a capstone block is added to the blockchains 103A-103N, a copy of the capstone block 123 is sent to the trusted authority 120 and then stored by the trusted authority 120.

The copies of lock block(s) 124 are copies of lock block(s) 124 that are stored in the blockchains 103A-103N. A lock block is added to the end of the blockchains 103A-103N based on an event designated for competition of the blockchain 103. For example, once a product ships, a lock block may be added to the end a blockchain 103 for the product. The event to lock a blockchain 103 may be any event that has been designated to complete the blockchain 103, such as, closing an account, completing a contract, completing a shipment, having an employee leave a company, decommissioning an application, and/or the like. Once a lock block is added to the blockchains 103A-103N, a copy of the lock block 124 is sent to the trusted authority 120 and then stored by the trusted authority 120.

Figure 2:
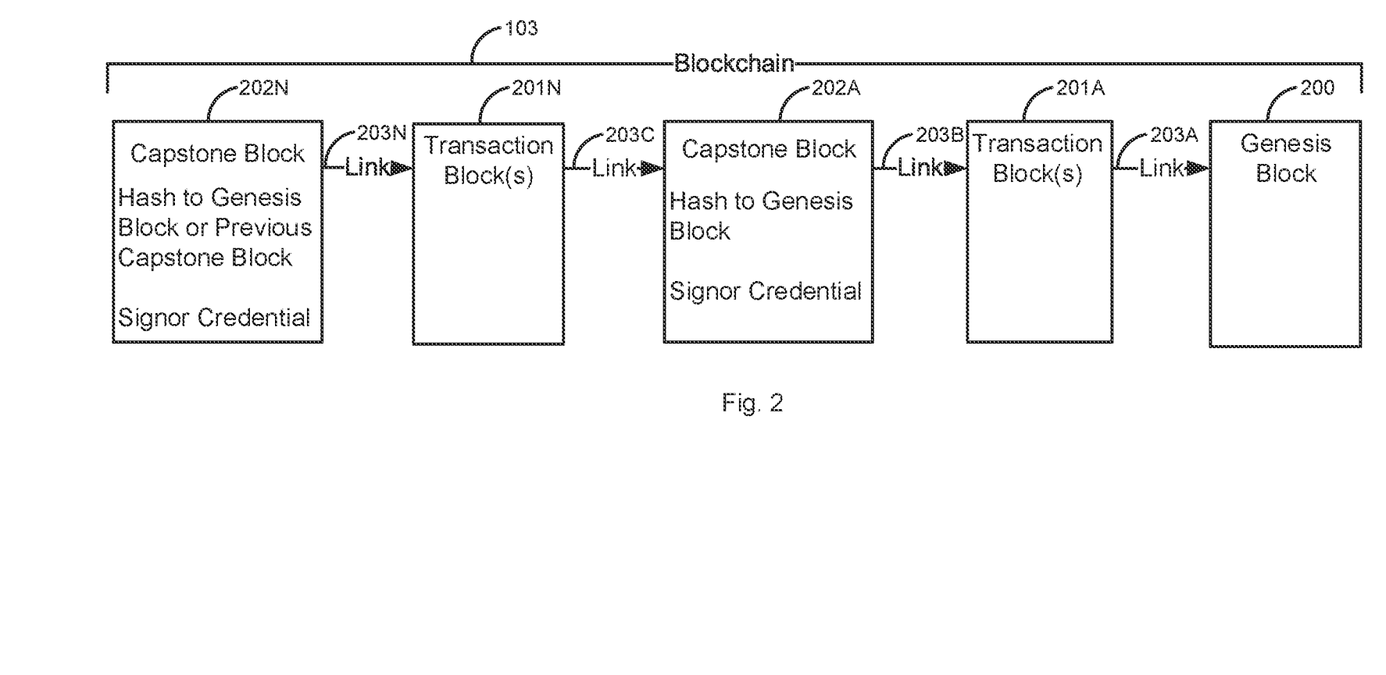
FIG. 2 is an exemplary example of a blockchain with capstone blocks.

FIG. 2 is an exemplary example of a blockchain 103 with capstone blocks 202A-202N. The blockchain 103 comprises a genesis block 200, transaction blocks 201A-201N, and capstone blocks 202A-202N. The blocks 201/202 also have forward links 203A-203N. The forward links 203A-203N are links that are used to link the blockchain 103 together. The links 203A-203N allow the blockchain manager 102 to verify a full forward hash of the blockchain 103.

The genesis block 200 is the first block in the blockchain 103. The genesis block 200 may include information that describes a type for the blockchain 103. For example, the genesis block 200 may indicate that the blockchain 103 is for tracking user transactions or financial transactions.

The transaction blocks 201A-201N may be any block that is added to the blockchain 103 based on a transaction/event. The transaction blocks 201A-201N are regular blocks that are added to the blockchain 103 as is traditionally known in the art. For example, the transaction block 201A-201N may be created when a user logs in to and logs out of a server.

The capstone blocks 202A-202N are added to the blockchain 103 to provide snapshots of the blockchain 103 so that the blockchain 103 can be validated based on the copies of the capstone blocks 123. The capstone blocks 202A-202N may have a digital certificate (i.e., a signor credential) of who/what signed the capstone block 202 (e.g., a user, a corporation, a device, an application etc. who completed a transaction). For example, the capstone block 202A may be where a package was loaded for shipment by company X and the capstone block 202N may be where the customer received the package. In this example, the transaction block 201N may be for various tracking events of the package. In addition, the capstone block 202 may have various types of information, such as, a full forward hash of the blockchain 103 when the capstone block 202 was added to the blockchain 103, a full reverse hash of the blockchain 103 when the capstone block 202 was added to the blockchain 103, a number of blocks (the number may or may not include the capstone block 202) in the blockchain 103 when the capstone block 202 was added to the blockchain 103, a forward hash of blocks to a previous capstone block (e.g., capstone block 202A) in the blockchain 103, a reverse hash of blocks from the previous capstone block 202A in the blockchain 103, a number of blocks in the blockchain 103 to the previous capstone block 203 (the number may or may not include the capstone block 202), and/or the like.

Once a capstone block 202 is added to the blockchain 103, a copy of the capstone block 123 is typically sent to the trusted authority 120. To validate that no tampering has occurred, the blockchain manager 102 gets the copy of the capstone block 123 from the trusted authority 120 to verify the blockchain 103 up to the point where the capstone block 202 was added to the blockchain 103. The information in the copy of the capstone block 123 may be verified with the blockchain 103 to determine if the blockchain 103 has been tampered with. In addition, the capstone block 202 may have multiple signor credentials (digital certificates) if multiple credentials are needed to create the capstone block 202. In this embodiment, each of the credentials may also be verified. Likewise, if there is only a single credential, the single credential can also be verified.

In one embodiment, the capstone block 202 may just be a hash of the blockchain 103. In this embodiment, just a hash is sent to the trusted authority 120.

In one embodiment, if multiple copies of the capstone block 123 have been stored by the trusted authority 120, each of the copies of the capstone blocks 123 may be returned from the trusted authority 120. This way, each segment of the blockchain 103 may be individually validated by the copies of the capstone blocks 123.

Figure 3:
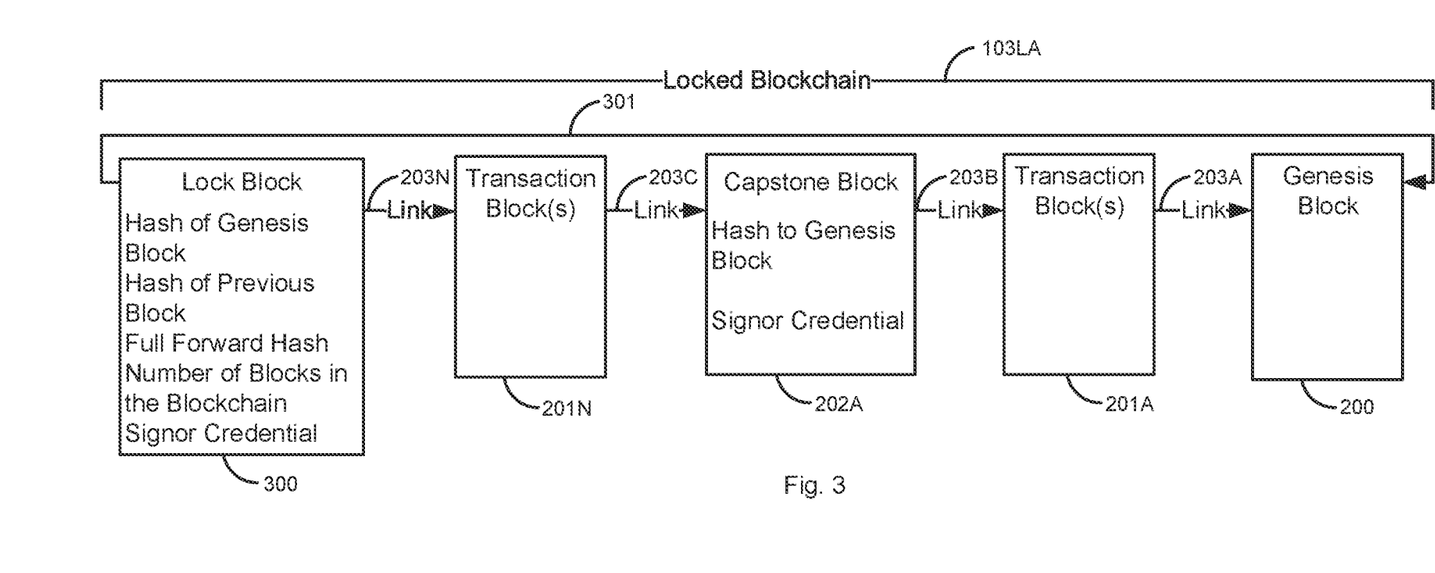
FIG. 3 is a first exemplary example of a locked blockchain with a capstone block and a lock block.

FIG. 3 is a first exemplary example of a locked blockchain 103LA with a capstone block 202 and a lock block 300. The locked blockchain 103LA comprises the genesis block 200, transaction blocks 201A-201N (like the blockchain 103), the capstone block 202A (like the blockchain 103), and the lock block 300. The locked blockchain 103LA comprises the forward links 203A-203N (like blockchain 103).

The lock block 300 is a type of capstone block 202 that is used to complete the locked blockchain 103LA. In this exemplary embodiment, the lock block 300 has a pointer 301 back to the genesis block 200. The lock block 300 also comprises a hash of the genesis block 200. The lock block 300 also has a pointer back to the previous block (link 203N) with a hash of the previous block (transaction block 201N). The lock block 300 may comprise other types of information, such as, a full forward hash of the locked blockchain 103LA, a full reverse hash of the locked blockchain 103LA, a number of blocks in the locked blockchain 103LA, a signor credential(s), and/or the like. In one embodiment, the lock block 300 may not have the link 301 back to the genesis block 200 and/or the hash of the previous block 201N.

Figure 4:
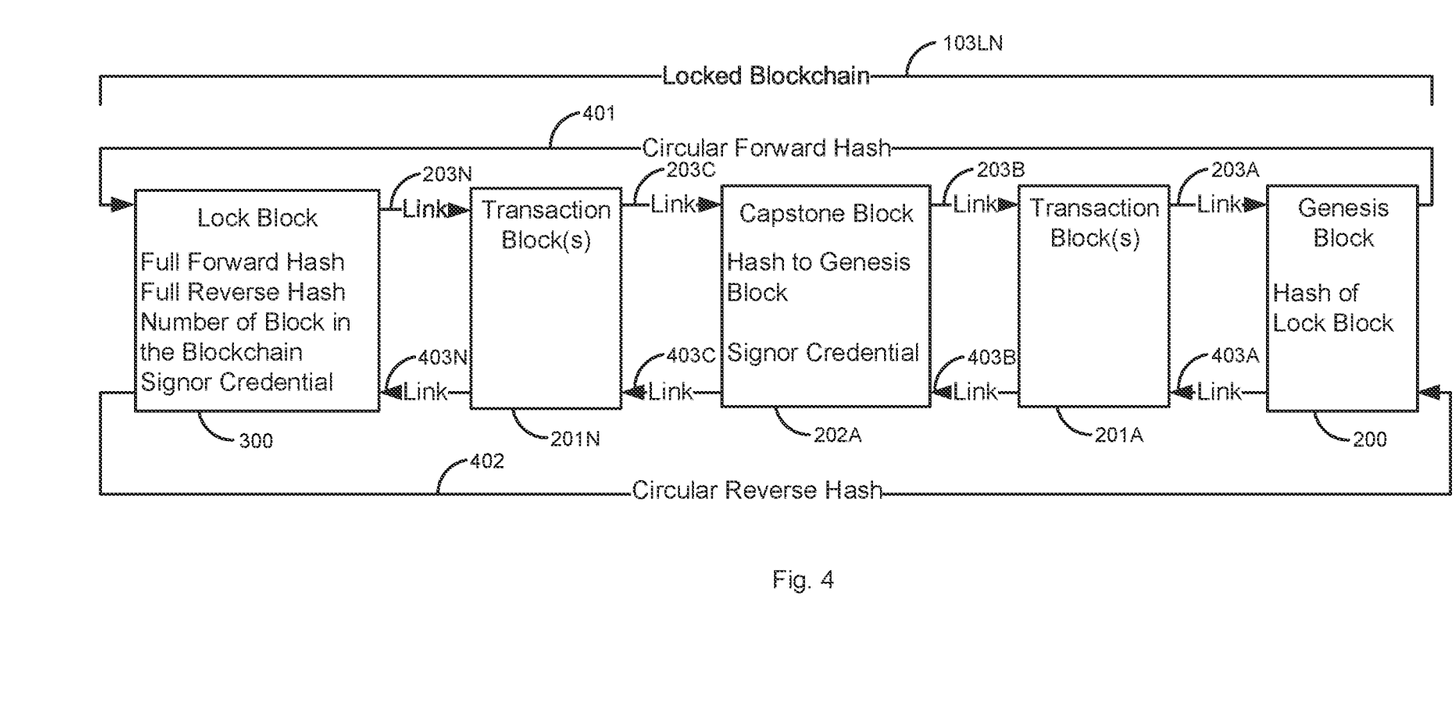
FIG. 4 is a second exemplary example of a locked blockchain with a capstone block and a lock block.

FIG. 4 is a second exemplary example of a locked blockchain 103LN with a capstone block 202A and a lock block 300. The locked blockchain 103LN comprises the genesis block 200, transaction blocks 201A-201N (like the blockchain 103), the capstone block 202A (like the blockchain 103), and the lock block 300. The locked blockchain 103LN comprises forward links 203A-203N (like blockchain 103). In addition, the locked blockchain 103LN comprises reverse links 403A-403N. The reverse links 403A-403N work like the forward links 203A-203N, but in the opposite direction. The reverse links may be added during the creation of the locked blockchain 103LN or when the lock block 300 is added to the locked blockchain 103LN.

The locked blockchain 103LN has a full circular doubly linked hash of the locked blockchain 103LN. When a lock block 300 is added to the locked blockchain 103LN, a new reverse hash may be added and the forward hash is completed. To complete the forward hash, a forward hash link 401 is added to the genesis block 200 that points back to the lock block 300. The genesis block 200 includes a hash of the lock block 300, thus creating a full circular forward hash.

In FIG. 4, a full reverse hash has also been added to the locked blockchain 103LN that points from the genesis block 200 through each block in locked blockchain 103LN back to the lock block 300. The lock block 300 has a pointer 402 that points back to the genesis block 200. Thus, the locked blockchain 103LN has a full circular forward hash/reverse hash. Here, the forward hash of the lock block 300 in the genesis block 200 is included in the reverse hash to prevent tampering of the hash of the lock block 300 in the genesis block 200. The lock block 300 (which has the full forward/reverse hash) is then sent to and stored by the trusted authority 120. The lock block 300 may include a signed credential (or a way to verify who/what locked (e.g., using Private Key Infostructure)) of who/what locked the locked blockchain 103LN). The lock block 300 can have a total number of blocks in the locked blockchain 103LN (this may include the lock block 300 or not) to detect any tampering. The doubly linked circular hash provides complete locking against all hash collisions. The lock block 300 may also have multiple certificates if it requires multiple users to lock the locked blockchain 103LN.

In one embodiment, the full reverse hash does not have to be part of the locked blockchain 103LN; however, the lock block 300 may still include the full reverse hash. Thus, the lock block 300 that is stored by the trusted authority 120 can provide the same immutability. In another embodiment, the forward/reverse hashes do not have to be circular.

In one embodiment, the capstone blocks 202 may work like the lock blocks 300 where there the capstone blocks 202 work like the lock blocks 300; however, in this embodiment, the blockchain 103 can still be added to and is not locked. In this example, each capstone blocks 202 work like the lock blocks 300 described above. Capstone blocks 202/lock blocks 300 can be used in all kinds of processes/blockchains 103, such as, supply chain (including software components, testing, hardware, etc.), smart contracts, purchase agreements, inventory management, credit card transactions, device management, etc.

In one embodiment, the full blockchain 103 or blocks from the previous capstone blocks 202 may be sent to the trusted authority 120. In this embodiment, the trusted authority 120 can provide a complete backup of the blockchain 103 if the blockchain 103 becomes corrupted or has been tampered with. If the trusted authority 120 receives the full blockchain 103 up to the latest capstone block 202, the trusted authority 120 can verify the full forward hash back to the genesis block 200 to make sure no tampering has occurred.

Figure 5:
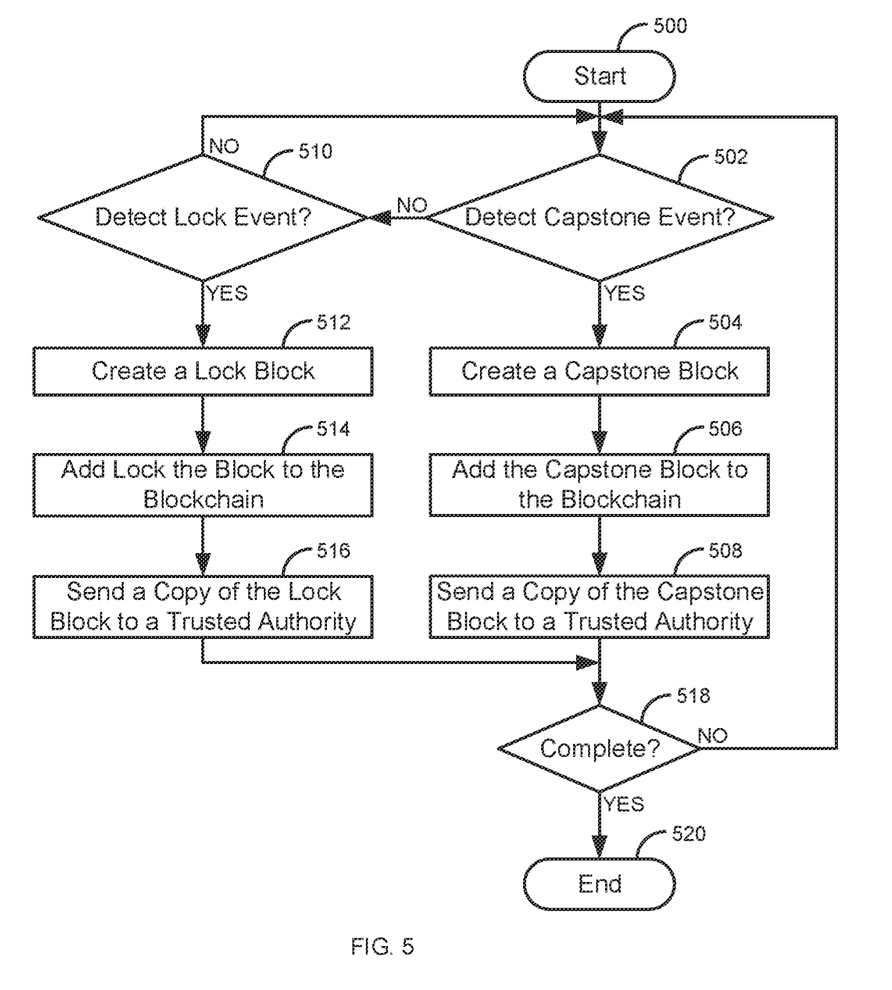
FIG. 5 is a flow diagram of a process for sending copies of capstone block(s) and/or a lock block to a trusted authority.

FIG. 5 is a flow diagram of a process for sending capstone block(s) 202 and/or a lock block 300 to a trusted authority 120. Illustratively, the communication devices 101A-101N, the blockchain managers 102A-102N, the blockchains 103A-103N, the trusted authority 120, the block manager 121, the authentication module 122, the copies of the capstone block(s) 123, and the copies of the lock blocks 124 are stored-program-controlled entities, such as a computer or microprocessor, which performs the method of FIGS. 5-8 and the processes described herein by executing program instructions stored in a computer readable storage medium, such as a memory (i.e., a computer memory, a hard disk, and/or the like). Although the methods described in FIGS. 5-8 are shown in a specific order, one of skill in the art would recognize that the steps in FIGS. 5-8 may be implemented in different orders and/or be implemented in a multi-threaded environment. Moreover, various steps may be omitted or added based on implementation.

The process starts in step 500. The blockchain manager 102 waits, to detect a capstone event in step 502. A capstone event is a defined event for creating a capstone block 202. If a capstone event is not detected in step 502, the blockchain manager 102 waits to detect a lock event in step 510. A lock event is a defined event for creating a lock block 300. If a lock event is not detected in step 510, the process goes back to step 502.

Otherwise, if a capstone event is detected in step 502, the blockchain manager 102 creates a capstone block 202 in step 504. The capstone block 202 may be created based on one or more rules. For example, the one or more rules may define that the hash is back to the genesis block 200 and/or that the hash is to the previous capstone block 202. The rules may be used to create any of the capstone blocks 202 described herein. The blockchain manager 102 adds the capstone block 202 to the blockchain 103 in step 506. The block chain manager 102 sends a copy of the capstone block 123 to the trusted authority 120 in step 508. The process then goes to step 518.

If a lock event is detected in step 510, the blockchain manager 102 creates a lock block 300 in step 512. The lock block 300 may be created based on one or more rules. For example, the one or more rules may define that the lock block 300 is created as one of the ways described above in FIGS. 3-4. The blockchain manager 102 adds the lock block 300 to the locked blockchain (e.g., locked blockchain 103LA) in step 514. The blockchain manager 102 sends a copy of the lock block 124 to the trusted authority 120 in step 516. The process then goes to step 518.

The blockchain manager 102 determines, in step 518, if the process is complete. If the process is not complete in step 518, the process goes back to step 502. Otherwise, if the process is complete in step 518, the process ends in step 520.

Figure 6:
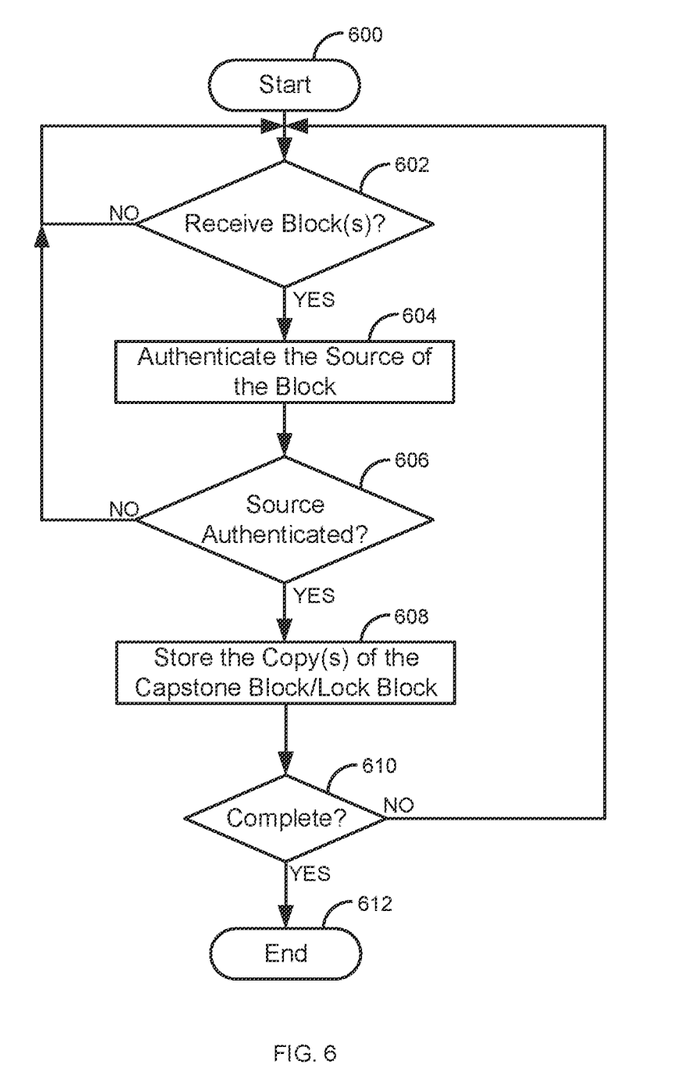
FIG. 6 is a flow diagram of a process for receiving and saving copies of capstone block(s) and/or a copy of a lock block at a trusted authority.

FIG. 6 is a flow diagram of a process for receiving and saving copies of capstone block(s) 123 and/or a copy of a lock block 124 at the trusted authority 120. The process of FIG. 6 may be implemented by using a separate thread/process for each tenant. The process starts in step 600. The block manager 121 waits, in step 602, to receive a block from the communication device 101. The block may be a copy of a capstone block 123 and/or a copy of a lock block 124. The block may comprise multiple blocks. For example, the blocks may comprise copies of multiple capstone blocks 123 (e.g., copies of the capstone blocks 202A-202N). If a block is not received in step 602, the process of step 602 repeats. If a block(s) is received in step 602, the block manager 121 authenticates the source of the block in step 604. The block manager 121 may authenticate the source of the block (e.g., the blockchain manager 102A) based on a digital certificate that is provided by the blockchain manager 102A. If the source of the block is not authenticated in step 606, the process goes back to step 602.

Otherwise, if the source of the block is authenticated in step 606, the block manager 121 stores the copy(s) of the capstone block(s) 123 and/or the copy of the lock block 124 in step 608. The block manager 121 determines, in step 610, if the process is complete. If the process is not complete in step 610, the process goes back to step 602. Otherwise, if the process is complete in step 610, the process ends in step 612.

Figure 7:
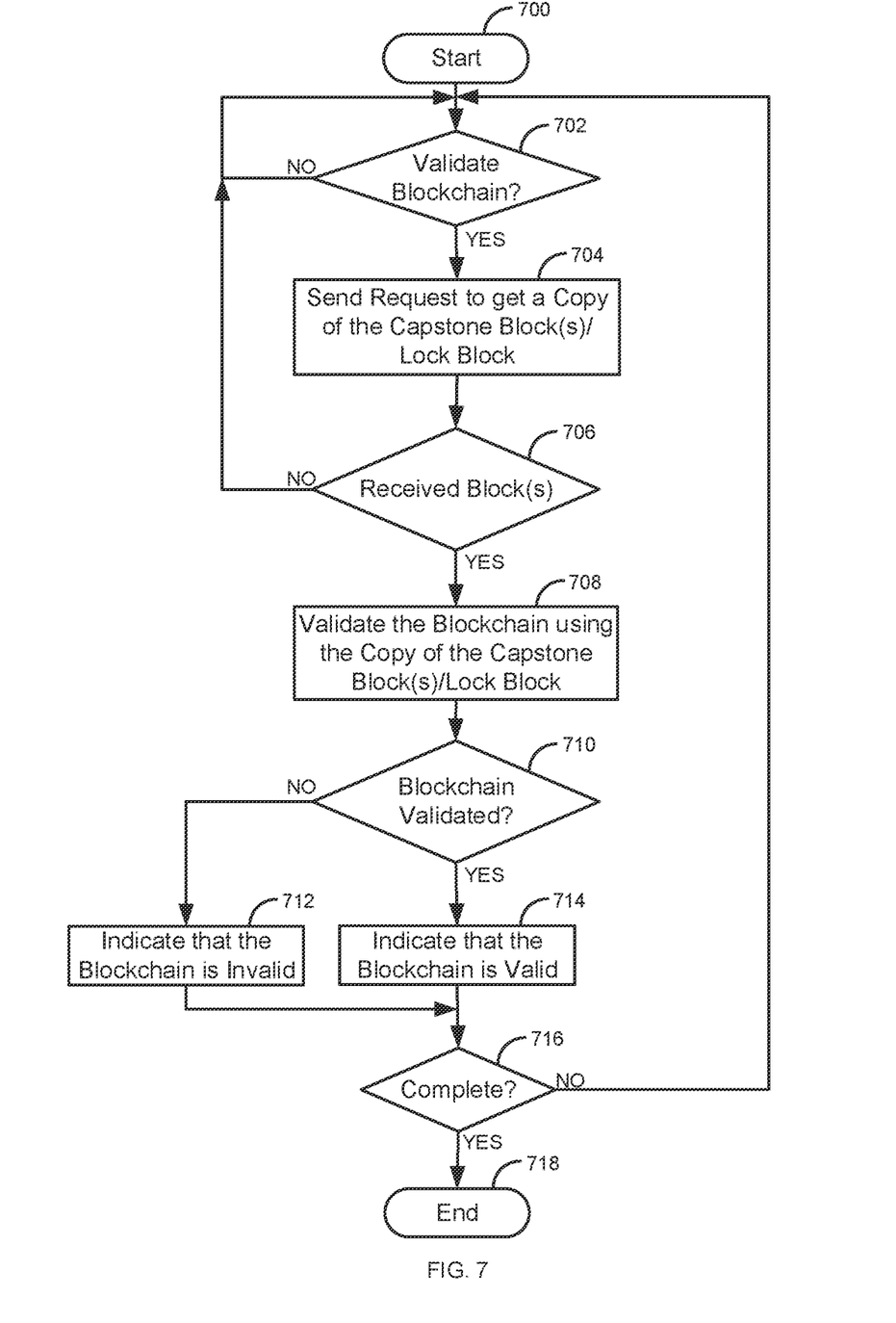
FIG. 7 is a flow diagram of a process for validating a blockchain by requesting a copy of capstone block(s) and/or a copy of a lock block from a trusted authority.

FIG. 7 is a flow diagram of a process for validating a blockchain 103 by requesting a copy of the capstone block(s) 123 and/or a copy of a lock block 124 from a trusted authority 120. The process starts in step 700. The blockchain manager 102 determines, in step 702, if the blockchain 103 needs to be validated. The decision to validate the blockchain 103 may be determined in various ways, such as, based on an event, a periodic event, a failed hash of the blockchain 103, a potential security threat, and/or the like. The request may be for a copy of the capstone block(s) 123 and/or a copy of the lock block 124. If the blockchain 103 is not to be validated in step 702, the process of step 702 is repeated.

If the blockchain 103 is to be validated in step 702, the blockchain manager 102 sends a request to get the copy of the capstone block(s) 123/copy of the lock block 124 in step 704. The request may also include the digital certificate to authenticate the blockchain manager 102 with the trusted authority 120. The blockchain manager 102 waits, in step 706, to receive the requested copy of the capstone block(s) 123 and/or the copy of the lock block 124. If the copy of the capstone block(s) 123 and/or the copy of the lock block 124 is not received in step 706, the process goes back to step 702.

Otherwise, if the copy of the capstone block(s) 123 and/or the copy of the lock block 124 is received in step 706, the blockchain manager 102 validates the blockchain 103 using the copy of the capstone block(s) 123/copy of the lock block 124 in step 708. For example, if the block is a copy of the lock block 124, the full forward hash of the blockchain 103 is compared to the full hash of the blockchain 103 that is stored in the copy of the lock block 124. If the block is a copy of a capstone block 123, the forward hash in the copy of the capstone block 123 is compared to a similar hash of the blockchain (e.g., a forward hash back to the genesis block 200 or a forward hash back to the previous capstone block 202).

If the blockchain 103 is not validated in step 708, the blockchain manager 102 sends a message to indicate that the blockchain 103 is invalid and/or has been tampered with in step 712. For example, an administrator may be notified of the invalid blockchain 103 in step 712. The process then goes to step 716. If the blockchain 103 is validated in step 710, the blockchain manager 102 indicates that the blockchain 103 is valid. For example, the blockchain manager 102 may indicate that the blockchain 103 was validated in a log file. The process then goes to step 716.

The blockchain manager 102 determines, in step 716, if the process is complete. If the process is not complete in step 716, the process goes back to step 702. Otherwise, if the process is complete in step 716, the process ends in step 718.

Figure 8:
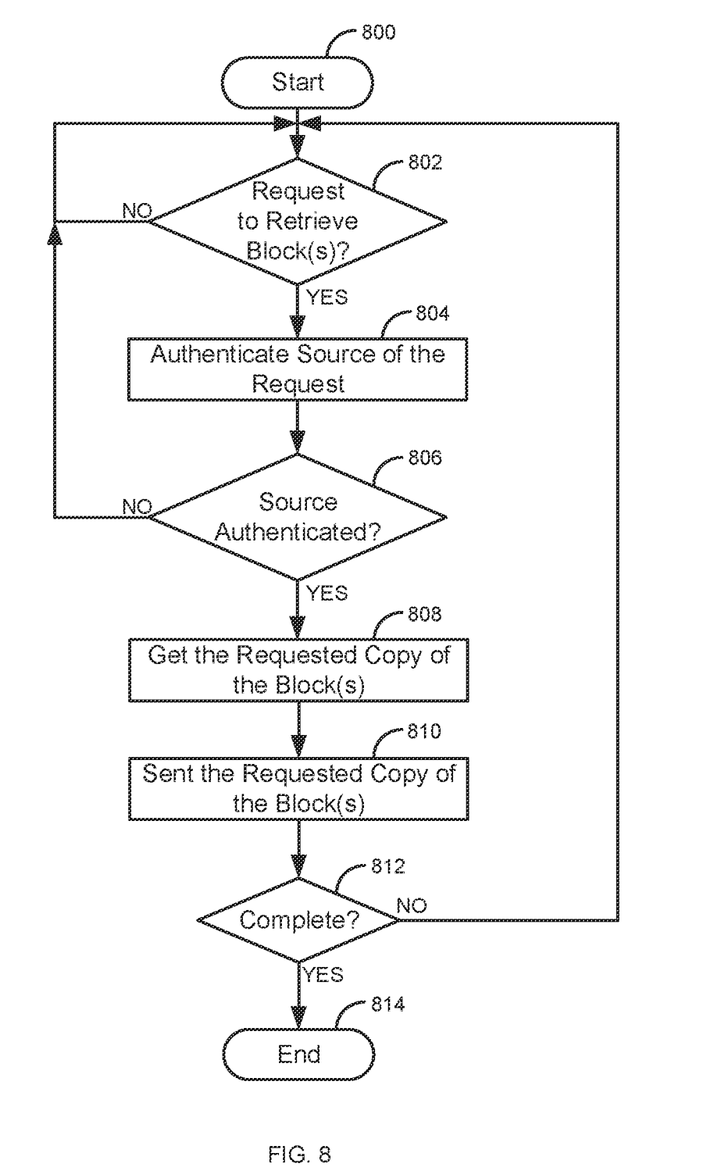
FIG. 8 is a flow diagram of a process for receiving a request to provide a copy of a capstone block(s) and/or a copy of a lock block.

FIG. 8 is a flow diagram of a process for receiving a request to provide a copy of a capstone block(s) 123 and/or a copy of a lock block 124. The process starts in step 800. The trusted authority 120 receives a request, from a communication device 101, to retrieve the copy of the capstone block(s) 123/copy of the lock block 124 in step 802. If the request to retrieve the copy of the capstone block(s) 123/copy of the lock block 124 is not received in step 802, the process of step 802 is repeated.

If the request to retrieve the copy of the capstone block(s) 123/copy of the lock block 124 is received in step 802, the authentication module 122 authenticates the source of the request in step 804 (e.g., communication device 101A/blockchain manager 102A). The authentication process can be accomplished in various ways, such as, verifying a digital certificate, a username/password, a biometric, and/or the like. The authentication module 122 determines, in step 806, if the source of the request has been authenticated. If the source of the request is not authenticated in step 806, the process goes back to step 802. Otherwise, if the source of the request is authenticated in step 806, the block manager 121 gets the requested copy of the capstone block(s) 123/copy of the lock block 124 in step 808. The block manager 121 sends, in step 810, the copy of the capstone block(s) 123/copy of the lock block 124 to the communication device 101/blockchain manager 102.

The block manager 121 determines, in step 812, if the process is complete. If the process is not complete in step 812, the process goes back to step 802. Otherwise, if the process is complete in step 812, the process ends in step 814.

Figure 9:
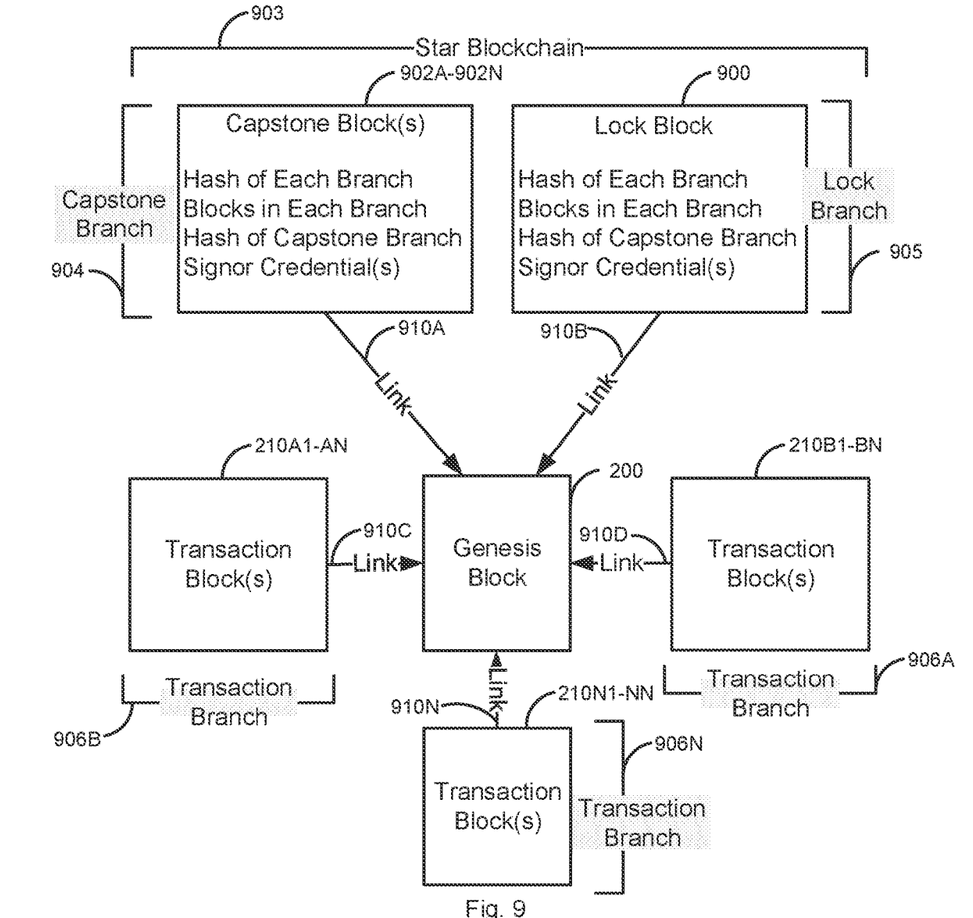
FIG. 9 is a diagram of a star blockchain with capstone block(s) and a lock block.

FIG. 9 is a diagram of a star blockchain 903 with capstone block(s) 902A-902N and a lock block 900. The star blockchain 903 comprises a genesis block 200, transaction blocks 201A1-201AN, transaction blocks 201B1-201BN, transaction blocks 201N1-201NN, capstone blocks 902A-902N, and a lock block 900. The star blockchain 903 also comprises transaction branches 906A-906N, capstone branch 904, and lock branch 905. The branches 904, 905, 906A-906N are linked to the genesis block 200 by links 910A-910N. If the branches 904 and/or 906A-906N comprise multiple blocks, the blocks will be linked together using links 910.

FIG. 9 is an exemplary embodiment of a non-traditional type of blockchain (a star blockchain 903). The star blockchain 903 is where different types of transactions have their own respective branches 906A-906N. Each transaction branch 906A-906N may be for different types of transactions or group of transactions. For example, each transaction branch 906 may be for all actions taken while an individual user is logged in to a system (e.g., each branch is a user branch), for specific types of devices being tracked (e.g., a separate branch 906 for all printers, all routers, all personal computers, etc.) and/or the like.

When a capstone event occurs (e.g., any described herein), a new capstone block 902 is created and added to the end of the capstone branch 901. If the capstone block 202 is the first capstone block 902, the capstone branch 904 is created and the capstone block 902 is added to the capstone branch. The capstone block(s) 902A-902N of FIG. 9 contain different information than the capstone blocks 202 described previously. The capstone blocks 902A-902N have a hash of each transaction branch 906A-906N at the time the capstone block 902 was added to the capstone branch 904. The capstone block 902 may have a number of blocks in each transaction branch 906A-906N and one or more signor credentials. The capstone block 902 may also have a hash of the capstone branch 904.

When a lock event occurs (e.g., any described herein), the lock branch 905 is created. The lock block 900 is added to the lock branch 905. The lock block 900 has a hash of each transaction branch 906A-906N. The lock block 900 may have a number of blocks in each transaction branch 906A-906N and one or more signor credentials. The lock block 900 may also have a hash of the capstone branch 904 and the number of capstone blocks 202. The lock block 900 may have a total hash of star blockchain 903. The hashes in the capstone block 902A-902N and the lock block 900 may be forward hashes and/or reverse hashes.

The process of sending, receiving, storing, and validating the capstone block(s) 902A-902N/lock block 900 works similar to that described for blockchains 103 as described herein. The blockchain managers 102A-102N will send/receive the copies of the capstone block(s) 123/copies of the lock block 124 in the same manner.

The process of FIG. 9 will work with other types of non-traditional blockchains. For example, the process of FIG. 9 will work with forked blockchain where each branch of the fork is tracked in a similar manner.

Examples of the processors as described herein may include, but are not limited to, at least one of Qualcomm® Snapdragon® 800 and 801, Qualcomm® Snapdragon®610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel®Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™ processors, ARM® Cortex-A and ARM926EJ-S™processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits several known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that can supply and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

Several variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the function, and the software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable medium, coupled with the microprocessor and comprising microprocessor readable and executable instructions that, when executed by the microprocessor, cause the microprocessor to:
   detect a first event, wherein the first event is a designated event for capturing a snapshot of a blockchain and wherein the blockchain is not replicated in a distributed ledger;
   in response to detecting the first event, create a capstone block;
   add the capstone block to the blockchain; and
   send a copy of the capstone block to a trusted authority, wherein the copy of the capstone block is used to validate at least a portion of the blockchain.

2. The system of claim 1, wherein the capstone block comprises at least one of:
   a full forward hash of the blockchain when the capstone block was added to the blockchain;
   a full reverse hash of the blockchain when the capstone block was added to the blockchain;
   a number of blocks in the blockchain when the capstone block was added to the blockchain;
   a forward hash of blocks to a previous capstone block in the blockchain;
   a reverse hash of blocks to the previous capstone block in the blockchain;
   a number of blocks in the blockchain to the previous capstone block; and
   a signor credential.

3. The system of claim 1, wherein the microprocessor readable and executable instructions further cause the microprocessor to:
   send a request to get the copy of the capstone block;
   receive the copy of the capstone block; and
   validate at least a portion of the blockchain using the copy of the capstone block, wherein the at least a portion of the blockchain is from the capstone block to a genesis block of the blockchain or from the capstone block to a previous capstone block in the blockchain.

4. The system of claim 1, wherein the capstone block is a lock block or a hash of the blockchain.

5. The system of claim 1, wherein the microprocessor readable and executable instructions further cause the microprocessor to:
   detect a second event, wherein the second event is a designated event for competition of the blockchain;
   in response to detecting the second event, create a lock block;

add the lock block to the blockchain; and send a copy of the lock block to the trusted authority, wherein the copy of the lock block is used to validate the blockchain.

6. The system of claim 5, wherein the lock block has at least one of:
 a hash of a genesis block of the blockchain;
 a pointer to the genesis block of the blockchain;
 a full forward hash of the blockchain;
 a full reverse hash of the blockchain;
 a number of blocks in the blockchain; and
 a signor credential.

7. The system of claim 5, wherein adding the lock block to the blockchain comprises one or more of:
 creating a circular forward hash of the blockchain and wherein creating the circular forward hash of the blockchain comprises adding a link in a genesis block of the blockchain and adding a hash of the lock block in the genesis block of the blockchain; and
 creating a circular reverse hash of the blockchain, wherein adding the circular reverse hash of the blockchain comprise adding reverse links in all blocks in the blockchain and wherein the lock block has a reverse link to the genesis block of the blockchain.

8. The system of claim 5, wherein the microprocessor readable and executable instructions further cause the microprocessor to:
 send a request to get the copy of the lock block;
 receive the copy of the lock block; and
 validate the blockchain using the copy of the lock block.

9. The system of claim 1, wherein the blockchain is a star blockchain, wherein adding the capstone block to the star blockchain comprises adding a capstone branch to the star blockchain, and wherein the capstone branch comprises the capstone block.

10. A method comprising:
 detecting, by a microprocessor, a first event, wherein the first event is a designated event for capturing a snapshot of a blockchain and wherein the blockchain is not replicated in a distributed ledger;
 in response to detecting the first event, creating, by the microprocessor, a capstone block;
 adding, by the microprocessor, the capstone block to the blockchain; and
 sending, by the microprocessor, a copy of the capstone block to a trusted authority, wherein the copy of the capstone block is used to validate at least a portion of the blockchain.

11. The method of claim 10, wherein the capstone block comprises at least one of:
 a full forward hash of the blockchain when the capstone block was added to the blockchain;
 a full reverse hash of the blockchain when the capstone block was added to the blockchain;
 a number of blocks in the blockchain when the capstone block was added to the blockchain;
 a forward hash of blocks to a previous capstone block in the blockchain;
 a reverse hash of blocks to the previous capstone block in the blockchain;
 a number of blocks in the blockchain to the previous capstone block; and
 a signor credential.

12. The method of claim 10, further comprising:
 sending a request to get the copy of the capstone block;
 receiving the copy of the capstone block; and
 validating at least a portion of the blockchain using the copy of the capstone block, wherein the at least a portion of the blockchain is from the capstone block to a genesis block of the blockchain or from the capstone block to a previous capstone block in the blockchain.

13. The method of claim 10, further comprising:
 detecting a second event, wherein the second event is a designated event for competition of the blockchain;
 in response to detecting the second event, creating a lock block;
 adding the lock block to the blockchain; and
 sending a copy of the lock block to the trusted authority, wherein the copy of the lock block is used to validate the blockchain.

14. The method of claim 13, wherein the lock block has at least one of:
 a hash of a genesis block of the blockchain;
 a pointer to the genesis block of the blockchain;
 a full forward hash of the blockchain;
 a full reverse hash of the blockchain;
 a number of blocks in the blockchain; and
 a signor credential.

15. The method of claim 13, wherein adding the lock block to the blockchain comprises one or more of:
 creating a circular forward hash of the blockchain and wherein creating the circular forward hash of the blockchain comprises adding a link in a genesis block of the blockchain and adding a hash of the lock block in the genesis block of the blockchain; and
 creating a circular reverse hash of the blockchain, wherein adding the circular reverse hash of the blockchain comprise adding reverse links in all blocks in the blockchain and wherein the lock block has a reverse link to the genesis block of the blockchain.

16. The method of claim 13, further comprising:
 sending a request to get the copy of the lock block;
 receiving the copy of the lock block; and
 validating the blockchain using the copy of the lock block.

17. A system comprising:
 a microprocessor; and
 a computer readable medium, coupled with the microprocessor and comprising microprocessor readable and executable instructions that, when executed by the microprocessor, cause the microprocessor to:
 receive a copy of a capstone block;
 store the copy of the capstone block, wherein the copy of the capstone block is used to validate at least a portion of a blockchain and wherein the blockchain is not replicated in a distributed ledger;
 receive a request to get the copy of the capstone block;
 in response to receiving the request to get the copy of the capstone block, validate the request to get the copy of the capstone block; and
 in response to validating the request to get the copy of the capstone block, send the copy of the capstone block.

18. The system of claim 17, wherein the copy of the capstone block comprises at least one of:
 a full forward hash of the blockchain when the capstone block was added to the blockchain;
 a full reverse hash of the blockchain when the capstone block was added to the blockchain;
 a forward hash of blocks to a previous capstone block in the blockchain;
 a reverse hash of blocks to a previous capstone block in the blockchain;
 a number of blocks in the blockchain when the capstone block was added to the blockchain;

a number of blocks in the blockchain to the previous capstone block; and a signor credential.

19. The system of claim 17, wherein the microprocessor readable and executable instructions further cause the microprocessor to:

receive a copy of a lock block;

store the copy of the lock block, wherein the copy of the lock block is used to validate the blockchain;

receive a request to get the copy of the lock block;

in response to receiving the request to get the copy of the lock block, validate the request to get the copy of the lock block; and in response to validating the request to get the copy of the lock block, send the copy of the lock block.

20. The system of claim 19, wherein the lock block has at least one of:

a hash of a genesis block of the blockchain;

a pointer to the genesis block of the blockchain;

a full forward hash of the blockchain;

a full reverse hash of the blockchain;

a number of blocks in the blockchain; and a signor credential.

\* \* \* \* \*